United States Patent
Mao (10) Patent No.: US 8,836,772 B2
(45) Date of Patent: Sep. 16, 2014

(54) 3D SHUTTER GLASSES WITH FRAME RATE DETECTOR

(75) Inventor: Xiaodong Mao, Foster City, CA (US)

(73) Assignee: Sony Computer Entertainment, Inc., Tokyo (JP)

( * ) Notice: Subject to any disclaimer, the term of this patent is extended or adjusted under 35 U.S.C. 154(b) by 246 days.

(21) Appl. No.: 13/115,885

(22) Filed: May 25, 2011

(65) Prior Publication Data

US 2012/0120208 A1    May 17, 2012

Related U.S. Application Data

(60) Provisional application No. 61/414,871, filed on Nov. 17, 2010.

(51) Int. Cl.
  *H04N 13/04*  (2006.01)
  *G02F 1/01*  (2006.01)
  *G02B 27/22*  (2006.01)

(52) U.S. Cl.
  CPC ...... *H04N 13/0497* (2013.01); *H04N 2213/008* (2013.01); *H04N 13/0438* (2013.01); *G02B 27/2264* (2013.01); *H04N 13/04* (2013.01)
  USPC .............................................. 348/54; 348/56

(58) Field of Classification Search
  CPC ... H04N 13/04; H04N 5/225; H04N 13/0497; G02F 1/01
  USPC ............ 348/54, 43, 53, 55, E13.062, E13.64, 348/E13.071, E13.075, E13.074; 340/10, 340/5.82; 704/275; 725/25, 153; 345/205–207, 714, 419
  See application file for complete search history.

(56) References Cited

U.S. PATENT DOCUMENTS

| | | | |
|---|---|---|---|
| 4,884,876 A | 12/1989 | Lipton et al. |
| 4,907,860 A | 3/1990 | Noble |
| 5,805,205 A | 9/1998 | Songer |
| 5,821,989 A | 10/1998 | Lazzaro et al. |
| 6,727,867 B2 | 4/2004 | Divelbiss et al. |
| 7,220,003 B2 | 5/2007 | Eguchi |
| 8,605,071 B2 | 12/2013 | Cheng et al. |

(Continued)

FOREIGN PATENT DOCUMENTS

| | | |
|---|---|---|
| CN | 101789217 A | 7/2010 |
| DE | 19533767 A1 | 3/1997 |

(Continued)

OTHER PUBLICATIONS

English Translation of Office Action mailed Nov. 27, 2012 in Japanese Application No. 2011-251096, 3 pgs.

*Primary Examiner* — Dave Czekaj
*Assistant Examiner* — Dramos I Kalapodas
(74) *Attorney, Agent, or Firm* — Kilpatrick Townsend LLP (57) ABSTRACT

Active shutter 3D glasses with multiple optical detectors, such as photodiodes, are described that detect a frame rate of a 3D television or other 3D display by using independent component analysis. The detected frame rate is used to update a clock onboard the 3D glasses that times the active shutters, thereby synchronizing the shutters to the 3D display. A switch can reverse the shutters in case the left eye/right eye images are shown oppositely.

20 Claims, 9 Drawing Sheets

(56) References Cited

U.S. PATENT DOCUMENTS

| | | |
|---|---|---|
| 2002/0122145 A1 | 9/2002 | Tung |
| 2002/0136551 A1* | 9/2002 | Ishihara et al. ............... 396/161 |
| 2005/0046704 A1* | 3/2005 | Kinoshita .................. 348/226.1 |
| 2005/0116881 A1 | 6/2005 | Divelbiss et al. |
| 2008/0062259 A1 | 3/2008 | Lipton et al. |
| 2010/0007582 A1 | 1/2010 | Zalewski |
| 2010/0079840 A1* | 4/2010 | Murtonen ...................... 359/238 |
| 2011/0199460 A1* | 8/2011 | Gallagher ........................ 348/46 |
| 2011/0234775 A1* | 9/2011 | MacNaughton et al. ....... 348/56 |
| 2011/0254932 A1* | 10/2011 | Doung ............................ 348/56 |
| 2011/0310235 A1* | 12/2011 | Sasaki et al. .................... 348/54 |
| 2012/0081527 A1* | 4/2012 | Richardson et al. ............ 348/56 |

FOREIGN PATENT DOCUMENTS

| | | |
|---|---|---|
| JP | 08-331603 | 12/1996 |
| JP | 1996331603 A | 12/1996 |
| JP | 9135400 A | 5/1997 |
| JP | 2005136751 A | 5/2005 |
| JP | 2009186258 A | 8/2009 |
| JP | 2009193096 A | 8/2009 |
| JP | 2009244138 A | 10/2009 |

\* cited by examiner

3D SHUTTER GLASSES WITH FRAME RATE DETECTOR

CROSS-REFERENCES TO RELATED APPLICATIONS

This application claims the benefit of U.S. Provisional Application No. 61/414,871, filed Nov. 17, 2010, which is hereby incorporated by reference in its entirety for all purposes.

BACKGROUND

1. Field of the Art

Embodiments of the present invention relate to electronic devices for viewing stereographic displays and, in particular, to actively shuttered three-dimensional ("3-D" or "3D") glasses synchronized in time with 3D enabled televisions.

2. Description of the Related Art

Televisions (TVs), monitors, and other displays have evolved over the years from black and white images to color, analog signals to digital high definition television (HDTV) formats, and cathode ray tube (CRT) screens to plasma and liquid crystal display (LCD) technologies. Three-dimensional ready televisions may be the next major upgrade that the general public endorses by buying in large quantities.

Three-dimensional ready televisions commonly incorporate stereoscopic displays. Stereoscopic displays present a separate image to a viewer's left eye and a separate image to the viewer's right eye. Technologies to present separate images to a viewer's eyes include anaglyphs, which typically use red and blue lens glasses, polarized lens glasses, and active shutter lens glasses for actively blocking the viewer's eyes in rapid, period sequence. All such lenses for 3D glasses are typically non-corrective lenses in that they do not redirect the direction of light (e.g., by refraction) as it passes through the lens.

For many 3D-ready televisions coming to market, their manufactures have developed vendor-unique protocols for viewing based on active shutter techniques. With active shutter techniques, a 3D television rapidly (e.g., 30 frames per second or greater) and alternatingly shows separate images for a viewer's left and right eyes. A viewer typically wears glasses that have liquid crystal (LC) active shutters rapidly blocking the left and right eye views alternatively so that each eye sees the corresponding left and right images shown at the corresponding time on the display. This "active shutter" process preferably is periodically and/or continuously synchronized with synchronization signals transmitted from the TV.

Currently, using an infrared (IR) link for transmitting a synchronization signal from the television to the glasses has proven both technologically efficient and economically affordable. Hence, an IR link has become the de-facto consensus for many major TV brands.

Current IR links are comprised of at least two parts: (1) an IR transmitter, either built-in inside the TV front panel or external as peripheral; and (2) an IR receiver built-in on the frame of the 3D glasses. The 3D television's IR transmitter continuously sends a synchronization signal to the IR receiver on the 3D glasses. This synchronization signal aligns the 3D glasses' lens timing to that of the television and corrects for wander in the 3D glasses' clock circuitry.

There exists a need in the art for more efficient and less expensive 3D glasses technology for synchronization with 3D televisions.

BRIEF SUMMARY

Generally, 3D glasses with multiple optical detectors (e.g., photodiodes) configured to detect the rapid flashing on and off of left and right images of a 3D display is disclosed. The detection is used to synchronize the 3D glasses' active shutter lenses to the display. The optical detectors each send their output to a comparator onboard the 3D glasses that is used to reject noise from other sources (e.g., daylight, a light bulb operating at 60 Hz) or noise from the sensors themselves. The comparator can weight the output from the optical detectors depending on their orientation on frames of the glasses.

Independent Component Analysis (ICA) can be used onboard the glasses to determine which signals come from the display (e.g., a 120 Hz flashing of left/right images) and which signals to reject (e.g., harmonics of a 60 Hz light bulb). Other techniques can be used to determine the frame rate of a display.

Embodiments of the present disclosure relate to an apparatus for viewing a stereoscopic display. The apparatus includes a pair of active shutter lenses, each lens enabled to alternate opacity and transparency, means for positioning the pair of lenses in front of a viewer's eyes, a first optical detector, a second optical detector; and a circuit operatively connected to the optical detectors and active shutter lenses, the circuit configured to synchronize alternating opacity and transparency of the lenses based on brightness data from the first and second optical detectors, in which the brightness data indicates a shutter rate based on a frame rate of a stereoscopic display.

The detectors can be photodiodes that are oriented at different angles from one another on frames of glasses, and their outputs can be weighted accordingly.

Some embodiments relate to a method for controlling active shutter lenses in three-dimensional glasses. The method includes receiving light in a first optical detector, the light including light from a left image and light from a right image of a 3D display over a period of time, receiving light in a second optical detector during substantially the same period of time, comparing brightness data corresponding to the light received by the first and second optical detectors to reject light from sources other than the display, and synchronizing active shutter lenses in 3D glasses using the comparison of the brightness data from the first and second optical detectors.

A further understanding of the nature and the advantages of the embodiments disclosed and suggested herein may be realized by reference to the remaining portions of the specification and the attached drawings.

DETAILED DESCRIPTION

In general, 3D glasses with active shutters are described that are capable of synchronizing with a display without a dedicated synchronization signal. The 3D glasses may synchronize with the display by analyzing, among other factors, the changes in brightness of the display to infer a frame rate of the display. The frame rate of the display can be used to determine a shutter rate for the glasses. The display may not need to comprise a specialized transmitter and the glasses may not need a specialized receiver.

The glasses can synchronize with the display by analyzing the changes in brightness of the display as it alternates between the frames intended for the right eye and the left eye of a viewer. The display may continuously alternate between the left eye and right eye views to support an active shutter system. As the display transitions between respective frames, the display dims, and, as a frame is displayed, the display brightens. Thus, the brightness may surge when displaying a frame and may drop when transitioning between frames.

Glasses in accordance with an embodiment may be comprised of and may have attached to them an array of a plurality of photodiodes. The photodiodes respond to light by generating current, voltage, or other signals. The amount of current or voltage generated by the photodiodes may correlate with the level of brightness of the detected light. In some instances, the photodiodes may respond in real-time to changes in brightness. The glasses may be comprised of one photodiode or an array of photodiodes.

The brightness data (e.g., voltage, current, digital signal) generated by a photodiode often has noise. Noise may be produced by the imprecise nature of the measuring device, by environmental factors, and/or by light sources other than the display. Noise in the brightness data may be minimized by using a plurality of photodiodes or other optical detectors. A photodiode array may be comprised of more than one photodiode, where the photodiodes may be distributed at various locations on the glasses. The aggregate brightness data generated by the photodiode array may be analyzed to minimize noise.

In addition, the brightness data may be analyzed to remove lighting data operating at a frequency of 60 hertz. This may remove the effect of light from traditional lighting sources powered by AC current in some nations. Also, various statistical models and methods known in the art describe signal separation techniques that may isolate and remove 60 hertz signals from the brightness data, as well as unwanted noise. The display may operate at a frequency other than 60 hertz, such as a multiple of 120 hertz, and thus may be isolated from the 60 hertz data.

Furthermore, using other statistical models, such as independent component analysis (ICA) and other forms of blind source separation (BSS), noise and signals from other light sources may be removed from the brightness data. Such techniques may detect multiple lighting sources, especially ambient light uncorrelated with the display. The use of one or more photo-diodes, such as the photo-diode array, can make detection of independent lighting sources more reliable.

Thus, the glasses may determine, by analyzing the aggregate brightness data generated by the photodiode array, when a display is likely presenting a frame and when it is transitioning between frames. This data produces a display frame rate. The active shutters on the glasses may synchronize with the display frame rate by transitioning between left eye views and right eye views when a comparator determines that the display is likely transitioning between frames. Thus the shutter rate may match the display frame rate.

The photodiodes may be placed at various locations on glasses. For example, the photodiodes may be placed on the glasses frame, along the front of the glasses, or along the ear pieces on the sides of the glasses. The photodiodes may be clustered near each other, or they may be spread out and may face different angles. In some embodiments, the concentration of the photodiodes may result in more photodiodes on the front of the glasses rather than the sides.

The photodiodes may generate brightness data in the form of current or voltage in response to exposure to light. Brightness data may reflect how bright the light is and when and how it is fluctuating. Photodiodes placed at various locations may generate slightly different brightness data, and their aggregate brightness data may be analyzed to reduce noise in the data and the effects of light from sources other than the display. Various methods may be used to analyze the aggregate brightness data to isolate the brightness data produced by the display.

One such method is independent component analysis (ICA). ICA is a method for separating a multivariate signal into additive subcomponents wherein supposing the mutual statistical independence of the non-Gaussian source signals. More generally, blind source separation, also known as blind signal separation, may be used to separate a set of signals from a multivariate signal, wherein assuming the mutual statistical independence and de-correlation of the separate set of signals. Such techniques may be implemented in hardware or software, or a combination of both. Noise and light from sources other than the display may be determined and sanitized from the aggregate brightness data from the display.

The sanitized aggregate brightness data may then be analyzed to determine the frame rate of the display. The frame rate of the display may be determined from the periodic peak and valleys of the brightness data, correlating to the peak of brightness when a frame for the right or left eye is displayed, and a dip of brightness when transitioning between frames for the left or right eye. The display, which continually alternates between left eye and right eye views in order to support an active shutter display, will repeatedly transition between frames.

The glasses may then transition the shutter on the glasses so as to block of the view of the currently unblocked eye and to unblock the view of the currently blocked eye when a transition is inferred from the sanitized aggregate brightness data. Thus, a shutter rate for the active shutters may be inferred from the frame rate of the display.

In an example embodiment, the frame rate may be determined at regular intervals, such as every minute or every four minutes. As a result of this implementation, a frame rate and a shutter rate may be determined and used for an interval of time before brightness data is collected again to determine a new frame rate and shutter rate. In addition, the brightness data may be analyzed over a long period of time, for example over a minute, and the shutter rate may be adjusted to match the frame rate derived every minute. Other periodic determinations of frame rate and shutter rate may also apply.

The brightness data from photodiodes located on the front of the glasses may be given more weight in the analysis of the aggregated brightness data. The photodiodes may determine and give greater weight to brightness detected from a lighted rectangle, such as would be expected from a screen or display capable of supporting 3D images, rather than a light bulb. The glasses may also be comprised of a front facing video camera that can determine where the display is, and thus give greater weight from light that is more likely to have originated from the display.

As mentioned before, the brightness data may be analyzed to remove lighting data operating at a frequency of 60 hertz or other frequencies. The 60 hertz data may be removed using the statistical methods described above or may be removed before application of said methods. For example, a high-pass filter with a corner frequency at 80 hertz can minimize interference from 60 hertz light. This may remove the effect of light from traditional lighting sources powered by AC current. The models may also determine the strongest 120 hertz signal and assume such a signal is the display. In Japan, due to different AC standards, a 50 hertz signal may be removed rather than the 60 hertz signal.

A switch may be used to indicate that the frames being displayed are reversed. That is, the left eye image is being displayed to the right eye. If the switch is triggered by a user, then the active shutters are reversed so that images are displayed to the opposite eye. The system may also analyze the brightness data to infer which frame should be displayed to which eye. For example, if it is determined that serial frames display a similar image, but the image in one frame is displayed slightly to the left, then that frame may be displayed as the right eye view.

Figure 1:
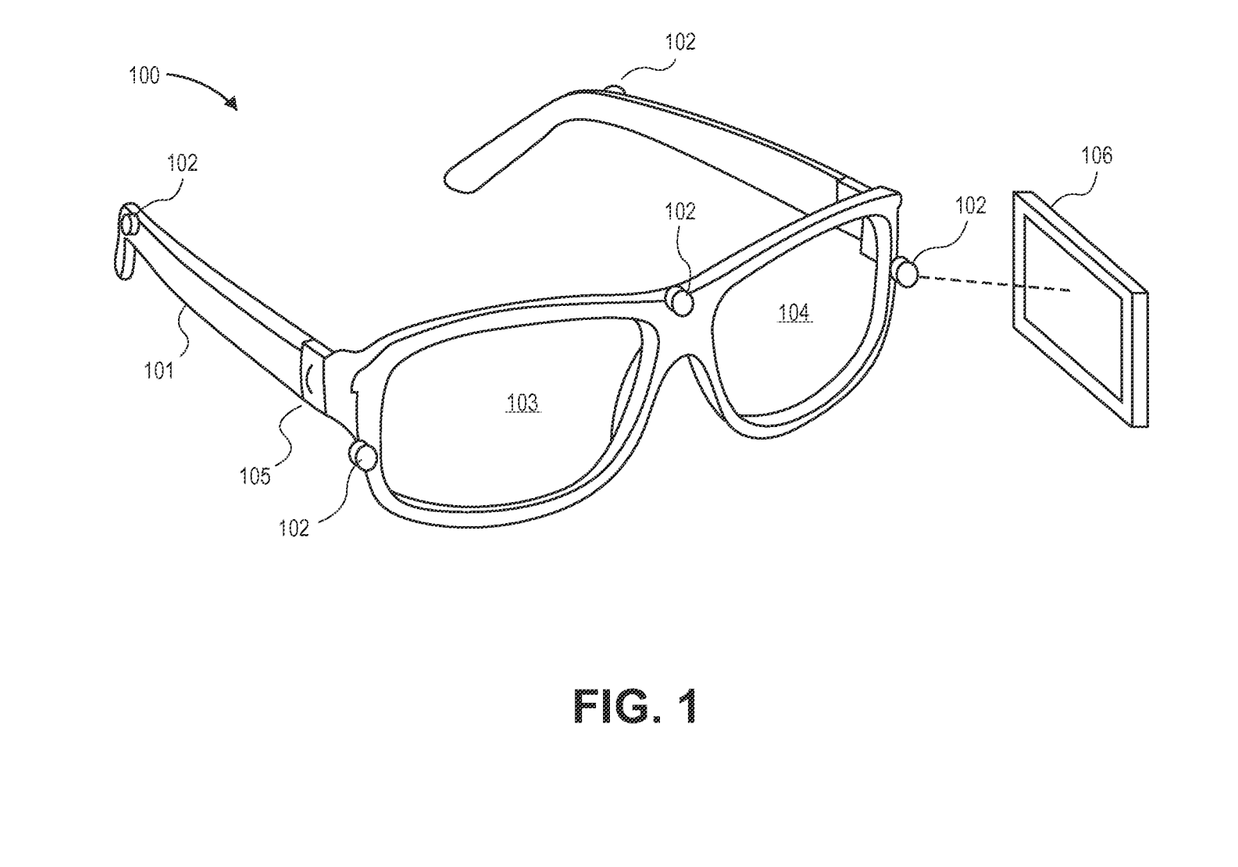
FIG. 1 illustrates a pair of 3D shutter glasses with frame rate detector system in accordance with an embodiment.

FIG. 1 is a pair of 3D shutter glasses with a frame rate detector system, according to an embodiment. Overall system 100 includes 3D shutter glasses 101 with the frame rate detector system and display 106. Glasses 101 may be comprised of photodiodes 102, right lens 103, left lens 104, and switch 105. Although several photodiodes are shown at various locations on glasses 101, there could be any number of photodiodes 102 at any location on the glasses 101. Lenses 103-104 may be active shutter lenses that may turn opaque or transparent depending on input. Lenses 103-104 may be liquid crystal. Display 106 may be a television, a handheld device with a viewing section, a monitor, or any device capable of presenting a series of frames to a user or capable of supporting active shutter images.

In some embodiments, the display has no special synchronization transmitter(s) for 3D glasses and is not marketed as a 3D-capable display. For example, an old progressively-scanned (as opposed to interlaced) television with a relatively high frame rate can be used. It can be hooked up to a digital versatile disc (DVD) player. A DVD can play a 3D movie that has alternating left and right images, which show on the display. A pair of 3D glasses in accordance with an embodiment can synchronize with the content on the display as it was meant to be viewed. Thus, a user can use an embodiment of the glasses to watch a 3D movie on an old television.

Photodiodes 102 on glasses 101 may receive light from display 106. In response to light exposure, photodiodes 102 may generate brightness data. The brightness data may be interpreted by logic within glasses 101 to determine the frame rate of display 106. After the frame rate of display 106 has been determined, the glasses may determine a shutter rate at which to shutter lenses 103-104. The shutter rate may match the frame rate of the display in order to alternate showing left and right eye views so that the viewer sees a stereoscopic image.

If the views for the right and left eye are reversed, then the user may trigger switch 105 to reverse the views. The switch can effectively reverse the left and right shutter controls or it can simply shift timing by ½ of a period (one over frame rate).

Figure 2:
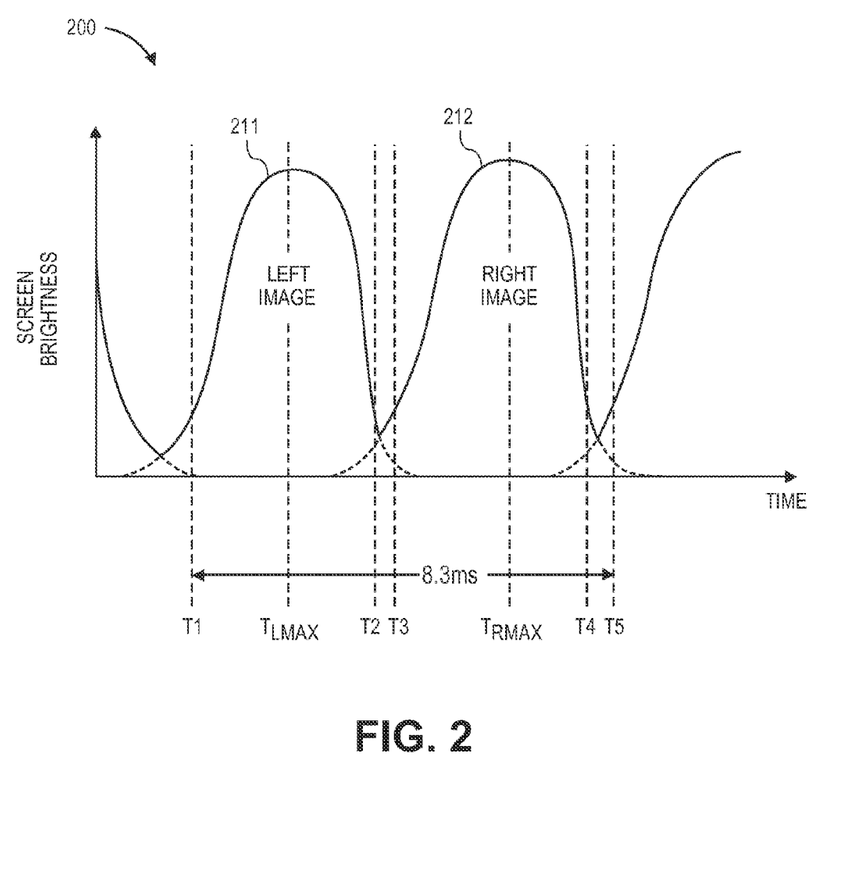
FIG. 2 is a chart of brightness data in accordance with an embodiment.

FIG. 2 is a chart illustrating brightness data, according to an embodiment. Chart 200 illustrates two peaks of brightness: left image peak 211 between times T1 and T2, and right image peak 212 between times T3 and T4. These peaks of brightness may represent times when display 106 (FIG. 1) is showing a particular frame. Between times T2 and T3, the brightness dims. This may represent when the display is transitioning between frames. In an example embodiment, the time between the transitioning frames may be small compared to the approximately 0.4 milliseconds for each pulse. A 120 hertz frame rate equates to a period of 8.333 milliseconds.

A pair of 3D shutter glasses with frame rate detector may analyze this brightness data over time and determine that, between T1 and T2, the display was showing a frame intended for the left eye view. It may also determine that between T2 and T3, the display was transitioning to a frame for the right eye view, which was displayed between times T3 and T4. At T5, the next left image frame is displayed.

Thus, the 3D shutter glasses with the frame rate detector may block the right eye view between the future times corresponding to T1 and T2 while making the left eye view of the active shutter lenses transparent. Later, the 3D shutter glasses with frame rate detector may block the left eye view between future times corresponding to T3 and T4, while making the right eye view of the active shutter lenses transparent.

Mathematically, if the period of dual images is calculated as P=T5−T1, then at time T1+nP the left lens switches to transparent and at time T1+(n+½)P the right lens switches to transparent. In these equations, P is the period (inverse of frame rate), and n is an integer.

Figure 3A:
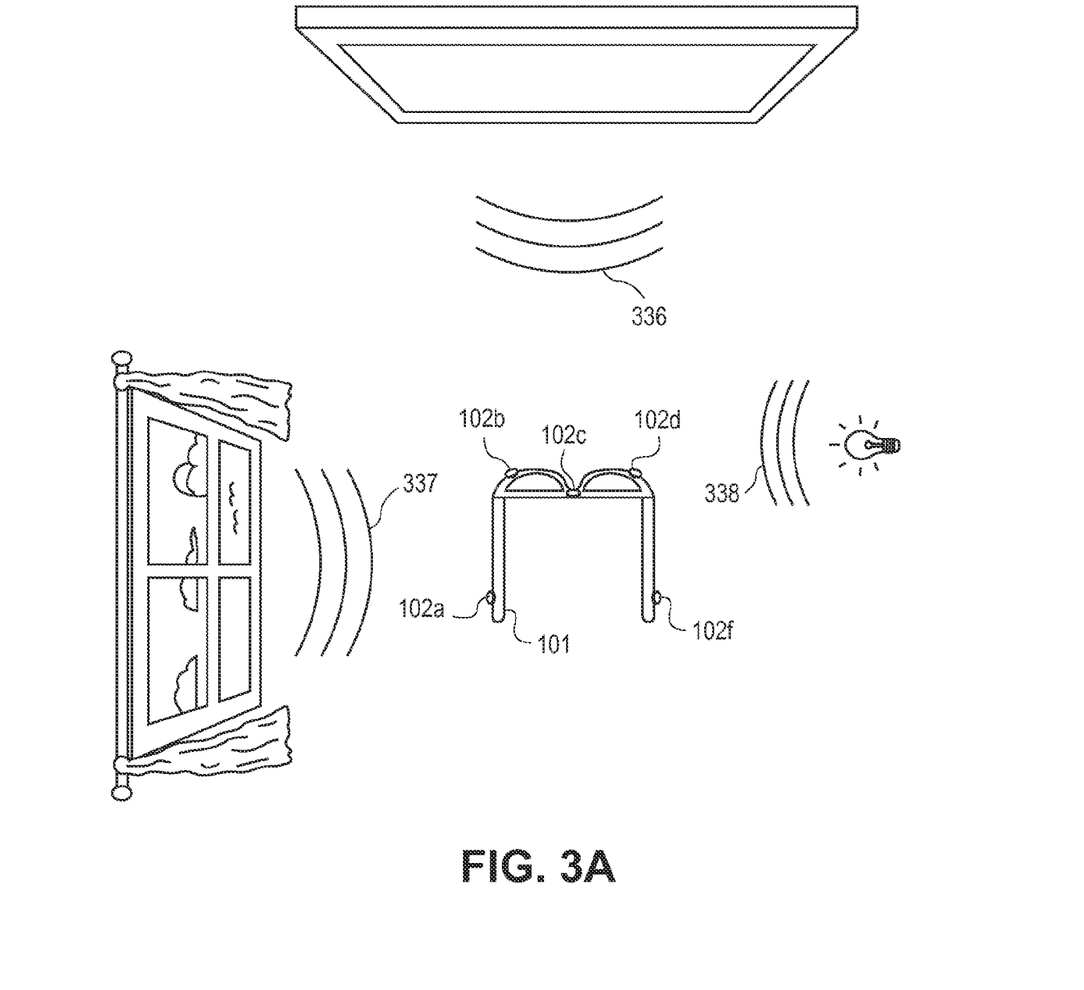
FIG. 3A illustrates 3D shutter glasses in a noisy environment in accordance with an embodiment.

FIG. 3A illustrates 3D shutter glasses in a noisy environment in accordance with an embodiment. 3D glasses 101 have photodiodes 102*a*, 102*b*, 102*c*, 102*d*, and 102*e* mounted on its frame. Some of the photodiodes are oriented at different angles from each other. For example, photodiode 102*a* and 102*b* are angled differently because photodiode 102*a* faces to the side while photodiode 102*b* faces diagonally forward. Photodiode 102*c* faces forward while side photodiodes 102*b* and 102*d* are slightly canted to the side. Photodiode 102*f* faces off the right side of the ear bridge of the glasses.

All the photodiodes sense light from the various sources reflecting in the room, but some detect certain sources more than others because of their proximity and their orientation. Photodiode 102*a* detects broadband, frequency-less (continuous) sunlight 337 streaming through a window. Photodiodes 102*b*, 102*c*, and 102*d* detect display light 336, which flickers with left and right images at 120 hertz. These photodiodes detect this light more than sunlight 337. Photodiode 102*f* detects light bulb light 338, which pulses at 60 hertz. Photodiode 102*f* detects this light more than display light 336 or sunlight 337.

Figure 3B:
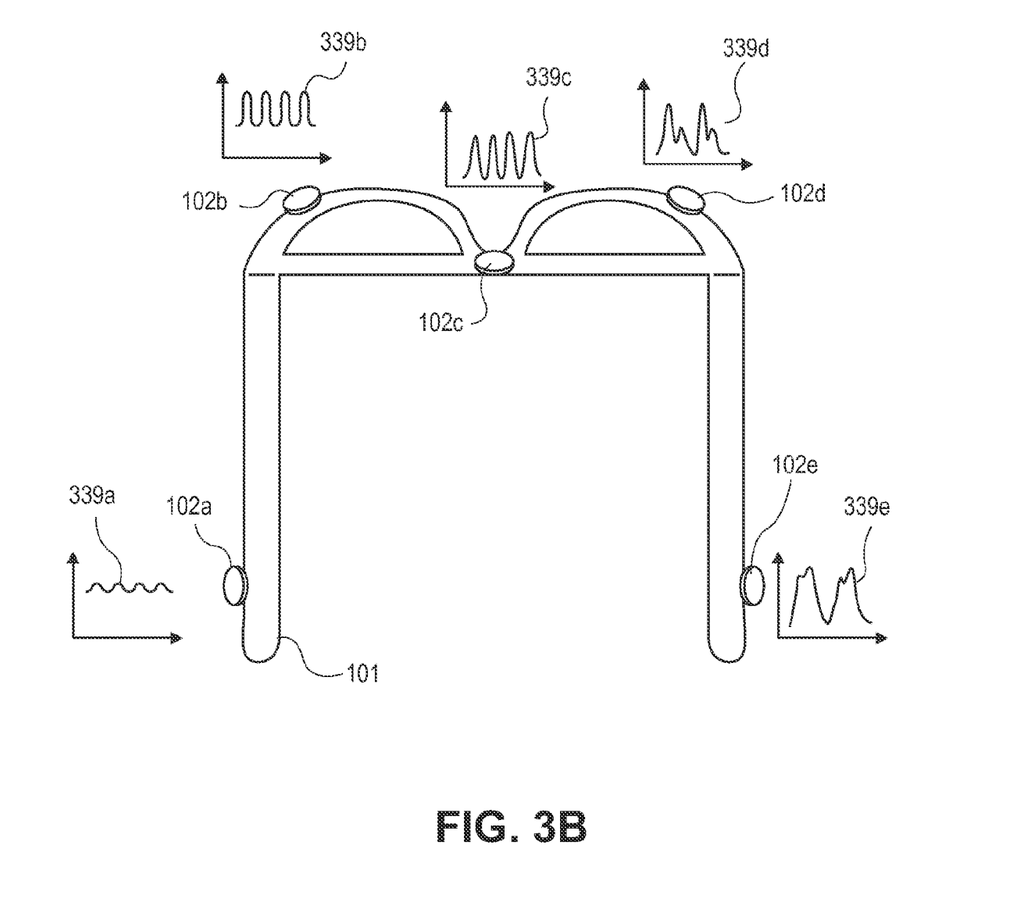
FIG. 3B illustrates output from optical sensors on the 3D shutter glasses of FIG. 3A.

FIG. 3B illustrates output from optical sensors on the 3D shutter glasses of FIG. 3A. Sensors 102*a*, 102*b*, 102*c*, 102*d*, and 102*e* output signals 339*a*, 339*b*, 339*c*, 339*d*, and 339*e*, respectively.

Signal 339*a*, which represents sunlight with a bit of background from the display and light bulb, is high and relatively continuous. It undulates slightly at 120 Hz and 60 Hz because of the faint background from the display and light bulb.

Signal 339*b*, which represents some sunlight with more display light and a little light bulb light, is relatively high but less continuous-wave than signal 339*a*. Its respective sensor, sensor 102*b*, is influenced by the 120 Hz refresh rate of the 3D television to which it is pointed, but it is also awash in unblocked sunlight from the window.

Signal 102*c*, which represents direct display light, shows a strong correlation with the light from the 120 Hz display. This may be the strong signal from the display.

Signal 339*d*, which represents a little sunlight with overtones of display light modulated with light bulb light, shows less of an elevated continuous wave. It has 120 Hz from the display modulated with 60 Hz from the light bulb, thereby pulsing up and down with a strong 120 Hz overlay.

Signal 339e, which represents mostly light bulb light, shows a strong 60 Hz signal with flitters of 120 Hz signal from the display. Like the signal from the left side of the glasses facing the window (i.e., signal 339a), this signal shows little effect from the 120 Hz display showing left and right images.

Figure 4:
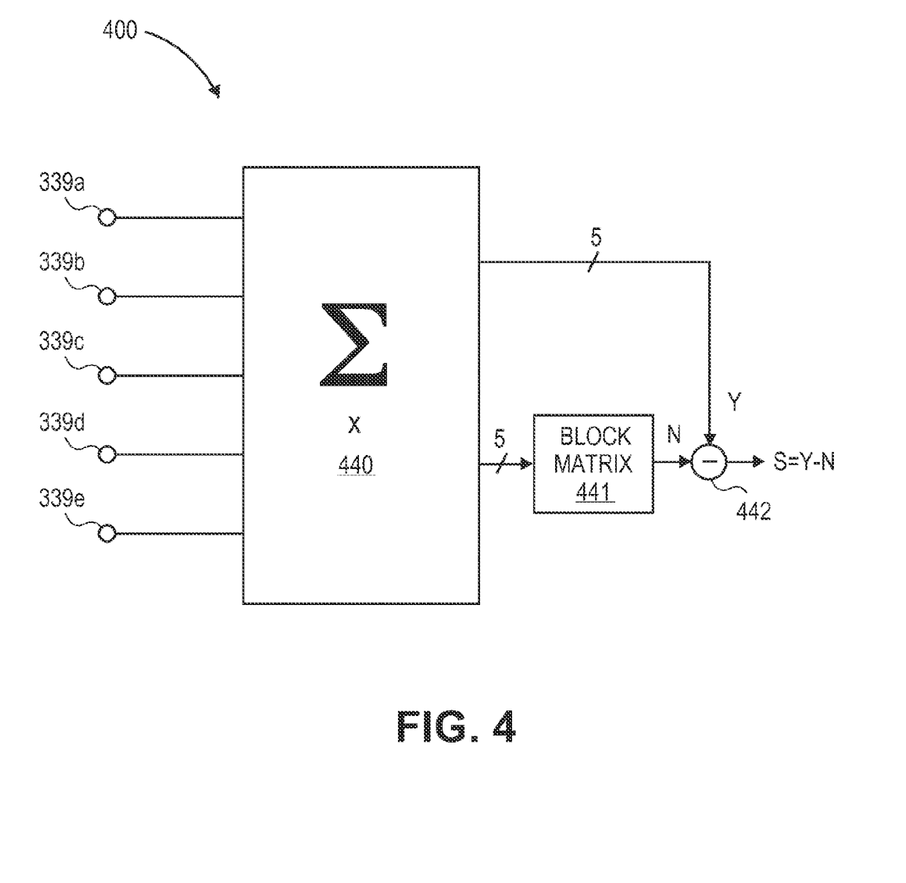
FIG. 4 illustrates noise cancellation in accordance with an embodiment.

FIG. 4 illustrates noise cancellation in accordance with an embodiment. In comparator 400, signals 339a, 339b, 339c, 339d, and 339e are fed into signal conditioner 440. The outputs from signal conditioner 440 are aggregated and then subtracted from a similar aggregation multiplied by block matrix 441 in subtractor 442. If Y is the measured signal and N is the noise, then final signal S is mathematically $S=Y-N$.

Figure 5:
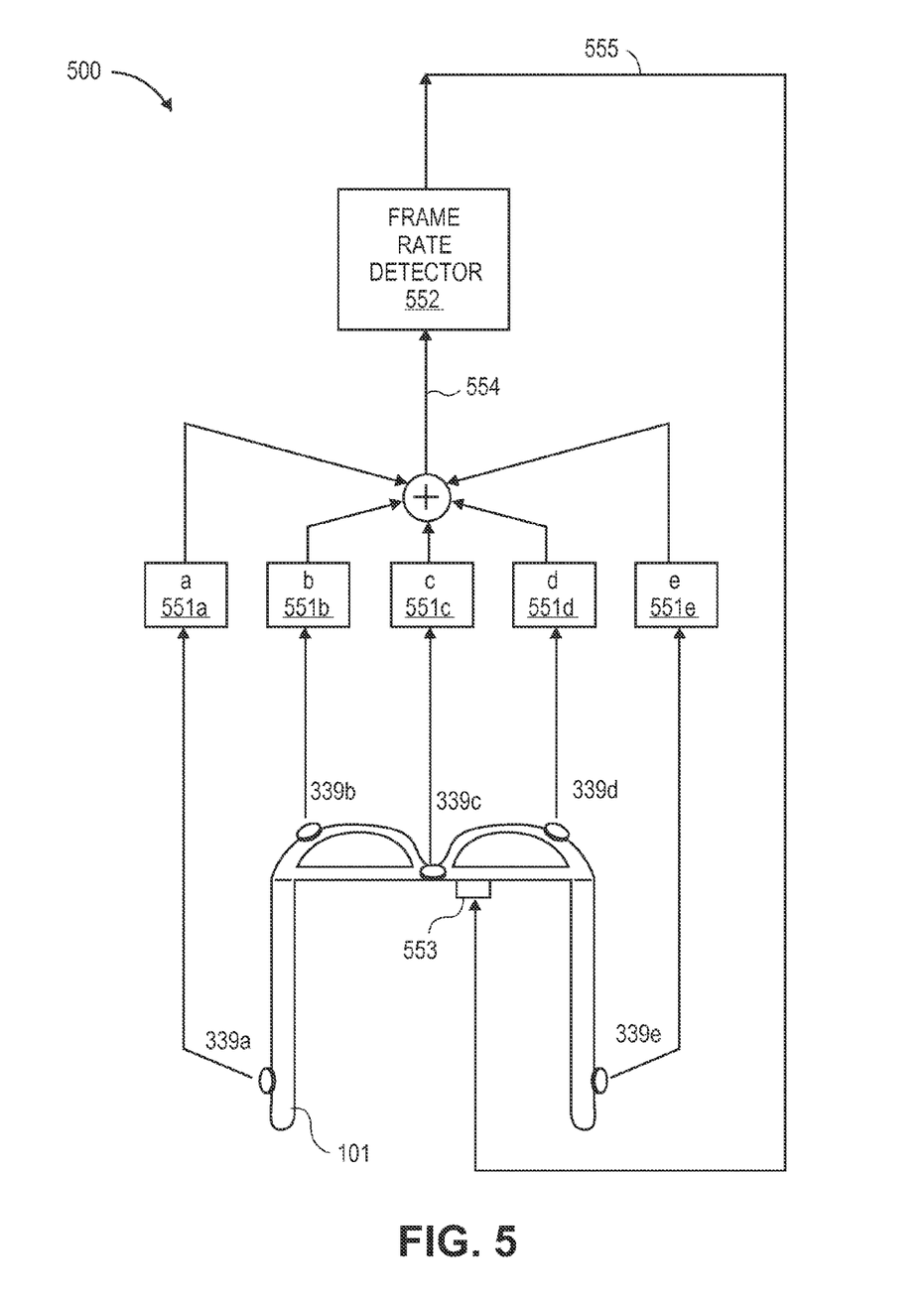
FIG. 5 illustrates frame rate detection for 3D shutter glasses synchronization in accordance with an embodiment.

FIG. 5 illustrates frame rate detection for 3D shutter glasses synchronization in accordance with an embodiment. In system 500, signals 339a, 339b, 339c, 339d, and 339e from glasses 101 sensors are multiplied by gains 551a, 551b, 551c, 551d, and 551e (i.e., gains a, b, c, d, and e), respectively. The gain corresponding to a signal from the centerline, forward-facing sensor (i.e., signal 339c) is greater than gains corresponding to signals from sideline, diagonal- or side-facing sensors (i.e., signals 339a, 339b, 339d, and 339e). The gains corresponding to signals from the sideline, diagonal-facing sensors (i.e., signals 339b and 339d) are greater than gains corresponding to signals from the sideline, side-facing sensors (i.e., signals 339a and 339e).

After weighting, the signals are summed together into aggregate signal 554 and input into frame rate detector 552. Frame rate detector 552 uses independent component analysis to determine which part of the aggregate signal comprises the frame rate of the display. Frame rate detector 552 has been programmed to look for frequencies in the aggregate signal around 120 Hz, which is common for 3D televisions. Frame rate detector 552 finds the valleys (i.e., minimums) and/or peaks (i.e., maximums) in the signal, in time or frequency space, and determines start time 555 of a right or left image display. Start time 555 is fed back to clock 553, which controls timing of the active shuttered lenses of 3D glasses 101. In this way, the signals from multiple optical detectors on 3D glasses can be used to initially synchronize and robustly correct drift of clock 553 (or compensate for drift in the television's frame rate).

Figure 6:
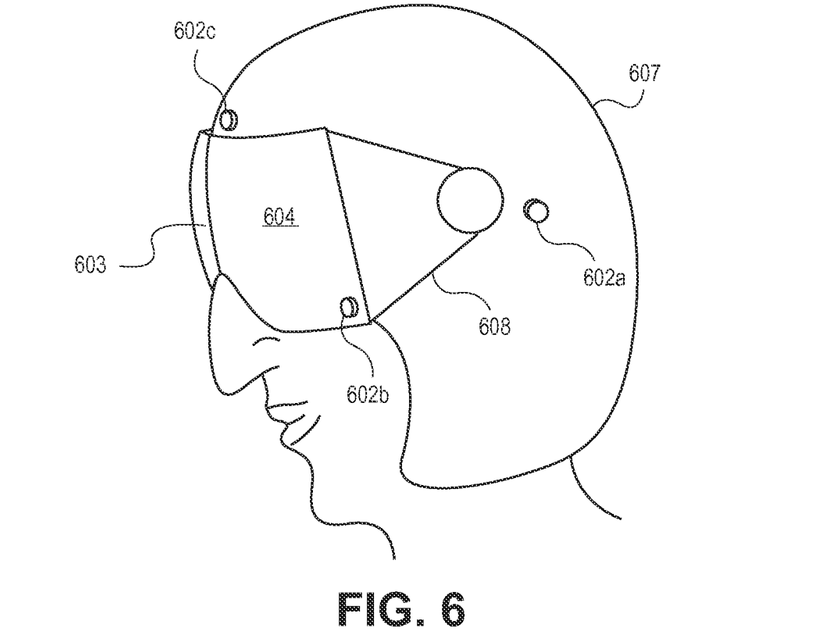
FIG. 6 illustrates a helmet and goggles with active shutter lenses in accordance with an embodiment.

FIG. 6 illustrates a helmet and goggles with active shutter lenses in accordance with an embodiment. Helmet 607 has visor/goggles 608 with active shutter lenses 603 and 604. Optical detectors 602a, 602b, 602c, 602d (not shown), and 602e (not shown) are integrated into the helmet and visor. Detector 602c is above the visor while detectors 602b and 602d are on the visor. Detectors 602a and 602e are mounted on helmet 607 on each side.

Other sensors can be integrated on a helmet on spaces that may not be available on glasses frames. For example, a sensor can be affixed to the rear of the helmet and face aft. A sensor may be attached to the top of the helmet and face up. Other sensors can be on the side and face down toward a neckline of the wearer.

Sensing diffuse light reflected from a shirt can reduce the need for sensors of high dynamic range. Light diffused by clothing may be at more easily measured and distinguished than direct sunlight and relatively dim display light.

Figure 7:
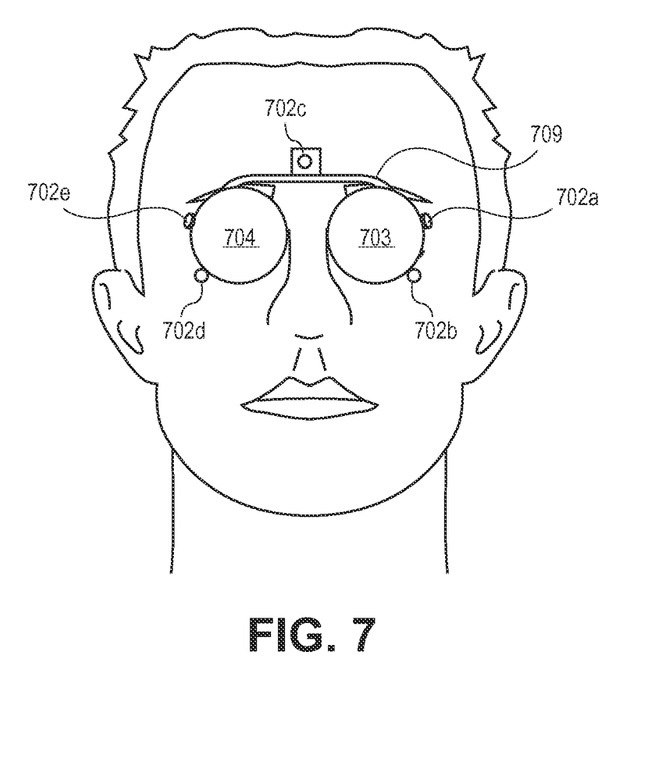
FIG. 7 illustrates pince-nez with active shutter lenses in accordance with an embodiment.

FIG. 7 illustrates minimalist pince-nez with active shutter lenses 703 and 704. In the exemplary embodiment, sensors 702a, 702b, 702c, 702d, and 702e are mounted on the lenses and bridge piece of pince-nez 709. Spectacles, pince-nez, monocles, binoculars, contact lenses, and other means for a wearer to don a lens or lenses in front of his or her eyes are contemplated. In addition, a stand with a pair of lenses placed at eye level, such as for a demonstration, is also contemplated. Lenses may wrap around the sides of a user's face or be minimalist, mounted just in front of the user's eyes.

Figure 8:
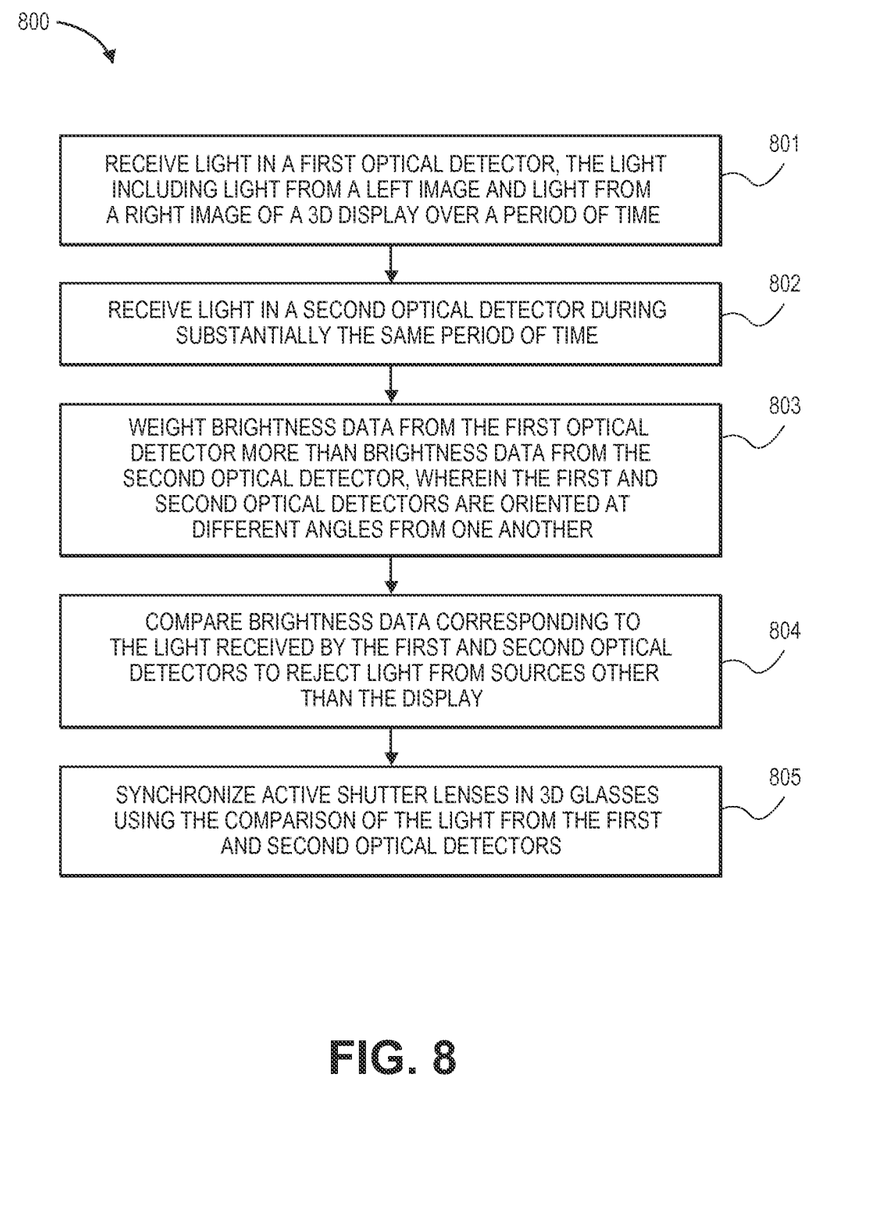
FIG. 8 illustrates a flowchart of a process in accordance with an embodiment.

FIG. 8 is a flowchart illustrating process 800 in accordance with one embodiment. In operation 801, light is received in a first optical detector, the light including light from a left image and light from a right image of a 3D display over a period of time. In operation 802, light is received in a second optical detector during substantially the same period of time. In operation 803, brightness data from the first optical detector is weighted more than brightness data from the second optical detector, in which the first and second optical detectors are oriented at different angles from one another. In operation 804, brightness data corresponding to the light received by the first and second optical detectors is compared in order to reject light from sources other than the display. In operation 805, active shutter lenses in 3D glasses are synchronized using the comparison of the light and brightness data from the first and second optical detectors.

The operations may be performed in the sequence given above or in different orders as applicable. They can be automated in a computer or other machine and can be coded in software, firmware, or hard coded as machine-readable instructions and run through one or more processors that can implement the instructions.

Figure 9:
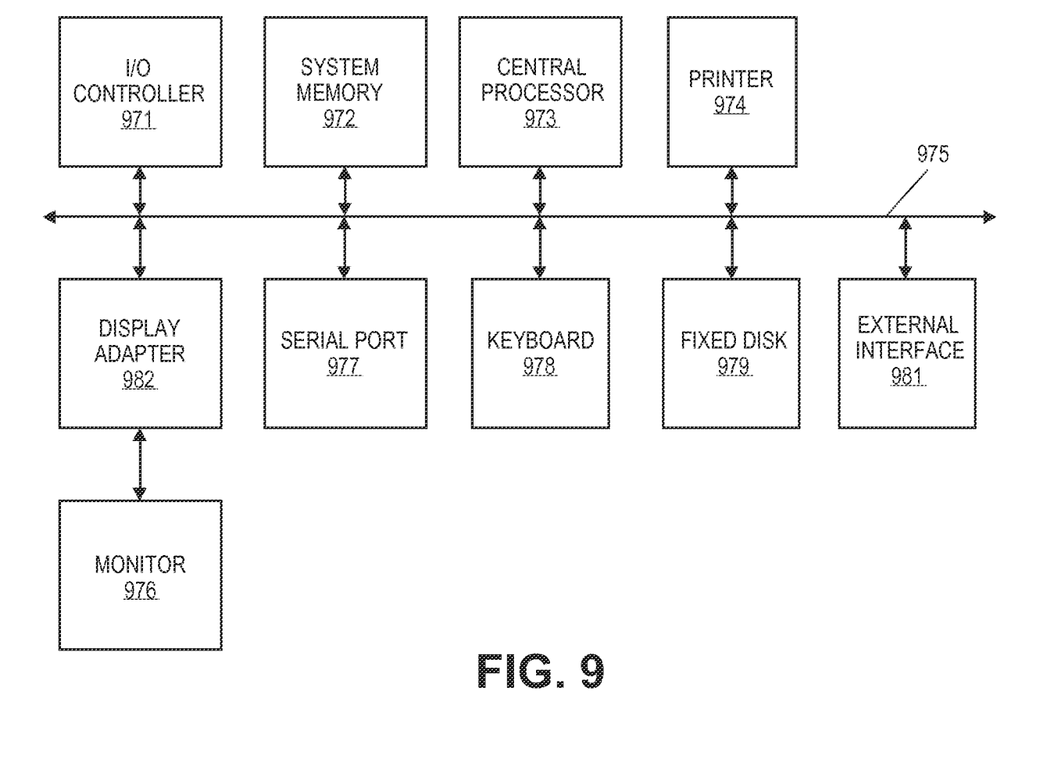
FIG. 9 illustrates a computer system in accordance with an embodiment.

FIG. 9 is a computer system, according to an example embodiment. The various participants and elements in the previously described system diagrams (e.g., glasses in FIG. 1) may use any suitable number of subsystems in the computer apparatus to facilitate the functions described herein. Examples of such subsystems or components are shown in the figure. The subsystems shown in the figure are interconnected via a system bus 975. Additional subsystems such as a printer 974, keyboard 978, fixed disk 979 (or other memory comprising computer-readable media), monitor 976, which is coupled to display adapter 982, and others are shown. Peripherals and input/output (I/O) devices, which couple to I/O controller 971, can be connected to the computer system by any number of means known in the art, such as serial port 977. For example, serial port 977 or external interface 981 can be used to connect the computer apparatus to a wide area network such as the Internet, a mouse input device, or a scanner. The interconnection via system bus allows the central processor 973 to communicate with each subsystem and to control the execution of instructions from system memory 972 or the fixed disk 979, as well as the exchange of information between subsystems. The system memory 972 and/or the fixed disk 979 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An apparatus for viewing a stereoscopic display, comprising:
   a pair of active shutter lenses, each lens enabled to alternate opacity and transparency;
   means for positioning the pair of lenses in front of a viewer's eyes;
   a first optical detector configured to provide a first set of brightness data;
   a second optical detector configured to provide a second set of brightness data; and
   a circuit operatively connected to the first optical detector, second optical detector, and active shutter lenses, the circuit configured to:
      combine the first set of brightness data and second set of brightness data to form aggregate brightness data;
      determine a dimming of brightness from the aggregate brightness data independent from any dedicated synchronization signal; and
      synchronize alternating opacity and transparency of the lenses based on the aggregate brightness data,
   wherein the dimming of brightness data indicates a shutter rate based on a frame rate of a stereoscopic display.

2. The apparatus of claim 1 wherein the first and second optical detectors are oriented at different angles from one another.

3. The apparatus of claim 2 wherein the first optical detector is oriented to face forward and its brightness data is weighted greater than brightness data from the second optical detector when combined to form the aggregate brightness data.

4. The apparatus of claim 2 wherein the means for positioning the pair of lenses includes a frame, wherein the first optical detector is on a front of the frame and the second optical detector is on a side of the frame.

5. The apparatus of claim 1 wherein the first and second optical detectors have a common orientation.

6. The apparatus of claim 1 wherein brightness data from the first and second optical detectors are used to reject noise.

7. The apparatus of claim 1 wherein the brightness data from the first and second optical detectors are compared with each other to reject noise.

8. The apparatus of claim 1 further comprising:
   a high-pass filter configured to reject brightness data operating at sixty hertz.

9. The apparatus of claim 1 further wherein the circuit employs independent component analysis (ICA) to identify light from sources other than the display.

10. The apparatus of claim 1 wherein the first optical detector comprises a photodiode.

11. A method for controlling active shutter lenses in three-dimensional (3D) glasses, the method comprising:
   receiving light in a first optical detector, the light including light from a left image and light from a right image of a 3D display over a period of time;

receiving light in a second optical detector during substantially the same period of time;

comparing brightness data corresponding to the light received by the first and second optical detectors to reject light from sources other than the display and determine a dimming of brightness data from the brightness data, independent from any dedicated synchronization signal, indicating a transition between the left image and right image of the 3D display; and synchronizing active shutter lenses in 3D glasses using the comparison of the determined transition.

12. The method of claim 11 further comprising:

weighting brightness data from the first optical detector more than brightness data from the second optical detector, wherein the first and second optical detectors are oriented at different angles from one another.

13. The method of claim 12 wherein the first optical detector is oriented to face forward.

14. The method of claim 11 wherein the brightness data corresponding to the light received by the first and second optical detectors are directly compared with each other to reject noise.

15. The method of claim 11 further comprising:

using independent component analysis (ICA) to identify light from sources other than the display.

16. The method of claim 11 wherein the comparison includes subtracting brightness data received from the second optical detector from brightness data received from the first optical detector.

17. The method of claim 11 further comprising:

filtering out light at sixty hertz.

18. The method of claim 11 wherein the first optical detector comprises a photodiode.

19. The method of claim 11 further comprising:

using blind source separation to identify light from sources other than the display.

20. The apparatus of claim 1 further comprising:

a high-pass filter with a corner frequency of 80 hertz configured to remove 60 hertz interference from the first set of brightness data, second set of brightness data, or aggregate brightness data.

* * * * *